US012705639B2

(12) United States Patent
Lim

(10) Patent No.: US 12,705,639 B2
(45) Date of Patent: Aug. 11, 2026

(54) METHOD OF PROCESSING NON-FUNGIBLE TOKEN

(71) Applicant: Dunamu Inc., Seoul (KR)

(72) Inventor: Jihoon Lim, Seoul (KR)

(73) Assignee: Dunamu Inc., Seoul (KR)

( * ) Notice: Subject to any disclaimer, the term of this patent is extended or adjusted under 35 U.S.C. 154(b) by 202 days.

(21) Appl. No.: 18/187,970

(22) Filed: Mar. 22, 2023

(65) Prior Publication Data

US 2023/0306460 A1 Sep. 28, 2023

(30) Foreign Application Priority Data

Mar. 23, 2022 (KR) ........................ 10-2022-0036350
Sep. 14, 2022 (KR) ........................ 10-2022-0115508

(51) Int. Cl.
*G06Q 30/0207* (2023.01)
*G06Q 20/38* (2012.01)

(52) U.S. Cl.
CPC ..... *G06Q 30/0236* (2013.01); *G06Q 20/3825* (2013.01)

(58) Field of Classification Search
CPC ........... G06Q 30/0236; G06Q 20/3825; G06Q 20/389; G06Q 20/401; G06Q 30/018; G06Q 30/0201
USPC ........................................................... 705/66
See application file for complete search history.

(56) References Cited

U.S. PATENT DOCUMENTS 11,593,321 B2 * 2/2023 Basu ........................ G06F 16/21
2016/0224977 A1 * 8/2016 Sabba .................. G06Q 20/385
2019/0311109 A1 * 10/2019 D'Agostino ............ G06F 21/44
2019/0340946 A1 * 11/2019 Elmessiry ................ G09B 5/12
2020/0184431 A1 * 6/2020 Sinmao .............. G06Q 20/3827
2021/0056548 A1 * 2/2021 Monica ............ G06Q 20/38215
2021/0158335 A1 5/2021 Bollen et al.
2021/0166306 A1 6/2021 Lee et al.
2023/0049512 A1 * 2/2023 Mandal ................. H04L 9/3239
2023/0274283 A1 * 8/2023 Kryvoshei ........... G06Q 20/407
2023/0291560 A1 * 9/2023 Jain ....................... H04L 9/3213

FOREIGN PATENT DOCUMENTS

CN 116823003 A * 9/2023 ......... G06Q 10/0639
KR 10-2019-0142889 A 12/2019
KR 10-2100457 B1 4/2020
KR 10-2116559 B1 5/2020
KR 10-2304627 B1 9/2021

* cited by examiner

*Primary Examiner* — Zeshan Qayyum
(74) *Attorney, Agent, or Firm* — Sughrue Mion, PLLC

(57) ABSTRACT

The present disclosure provides methods for generating and processing a token of a user by an electronic device. In some embodiments, the method includes receiving, from a user terminal, a message requesting to register the token. The token has been generated based on payment information of the user and a smart contract that uses the payment information. The method further includes registering the token, based on obtaining, from a blockchain network, a successful verification of the token. The method further includes updating a registration status of the registered token, based on the payment information. The method further includes determining whether to provide the user a reward for the registered token.

9 Claims, 9 Drawing Sheets

100
110
140
150
120
Network
130
131

FIG. 2

FIG. 3A 410
420
Franchise A
Franchise B
Franchise C
Franchise D
Beverage
Franchise E
Franchise F
Franchise G
Franchise H
Clothing
Franchise I
Franchise J
Franchise K
Franchise L
Travel

500

Franchise B 511 510 512

Account A

Account B

Account C

Figure 8:
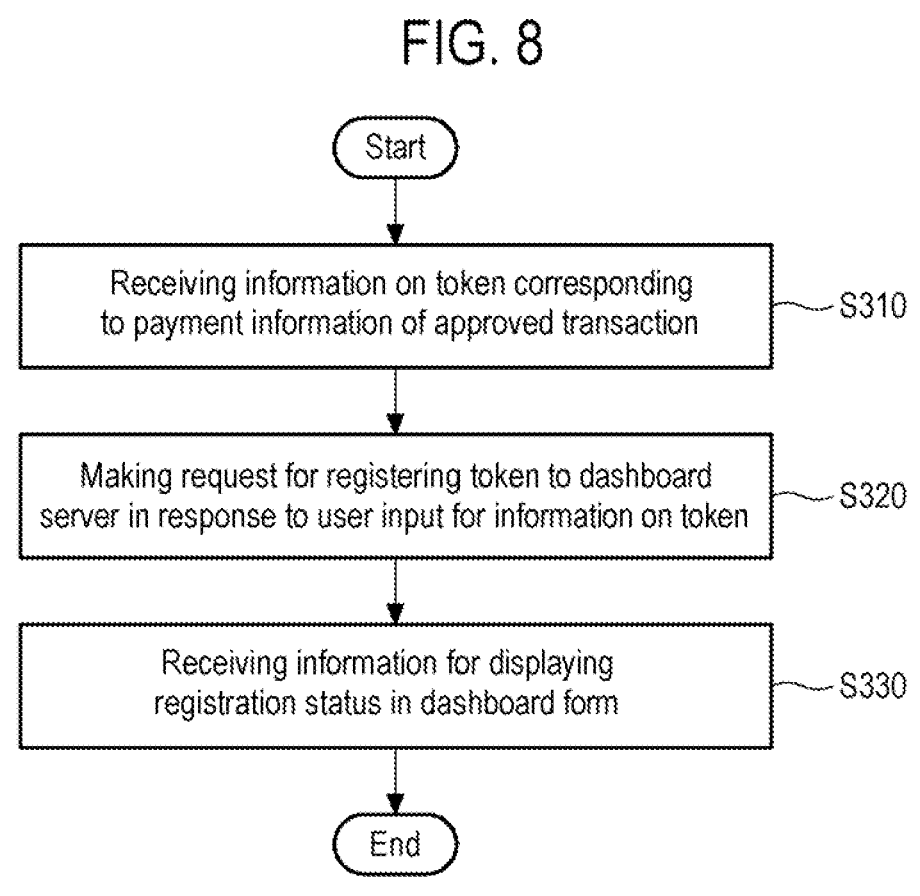

Start

Receiving information on token corresponding to payment information of approved transaction — S310

Making request for registering token to dashboard server in response to user input for information on token — S320

Receiving information for displaying registration status in dashboard form — S330

End

FIG. 9

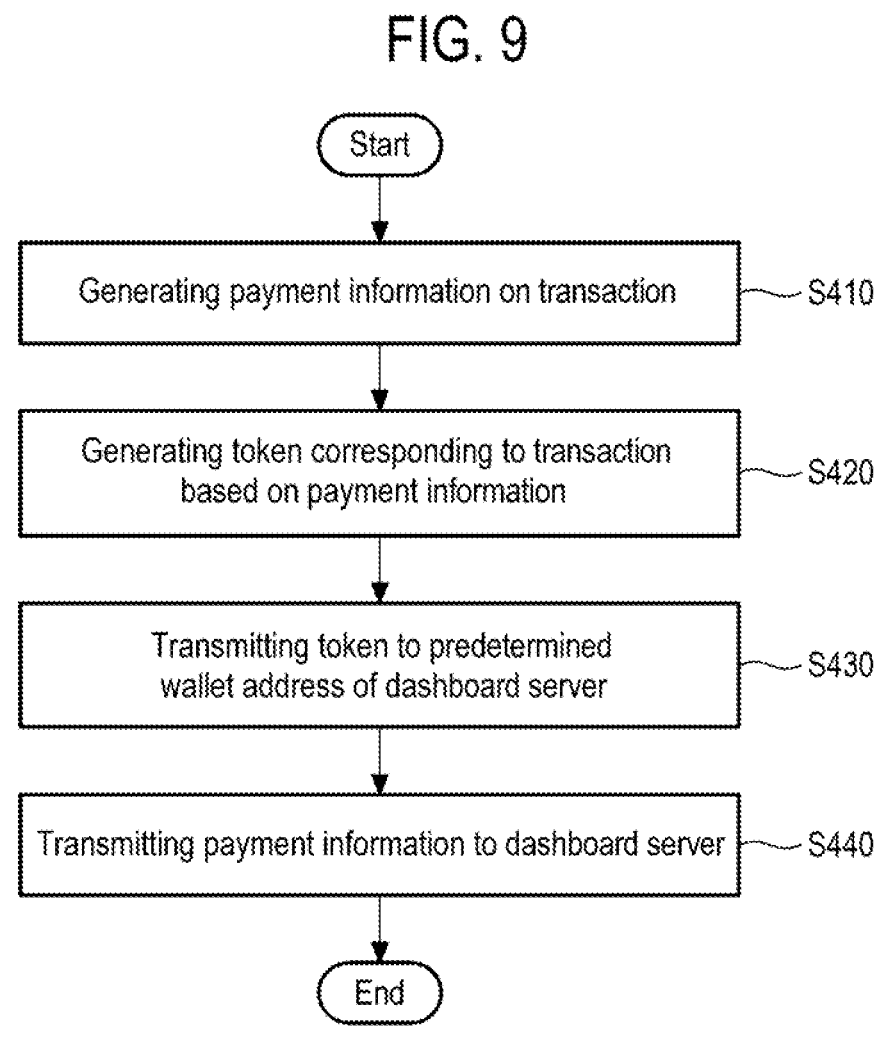

Start

Generating payment information on transaction — S410

Generating token corresponding to transaction based on payment information — S420

Transmitting token to predetermined wallet address of dashboard server — S430

Transmitting payment information to dashboard server — S440

End

METHOD OF PROCESSING NON-FUNGIBLE TOKEN

CROSS-REFERENCE TO RELATED APPLICATIONS

This application claims benefit of priority under 35 U.S.C. § 119 from Korean Patent Application No. 10-2022-0036350, filed on Mar. 23, 2022, and Korean Patent Application No. 10-2022-0115508, filed on Sep. 14, 2022, the disclosures of which are incorporated by reference herein in their entireties.

BACKGROUND

1. Field

The present disclosure relates generally to non-fungible tokens, and more particularly, to a technology for processing a non-fungible token.

2. Description of Related Art

With the recent development of social network services (SNSs), influencers that may make a significant impact on the public have appeared online. Given their impact on the public, companies may compensate influencers to produce product reviews that promote their products and/or services. Consequently, since the influencers have been compensated by the companies for their reviews, it may be difficult to objectively evaluate the products based on the reviews from the influencers. In addition, when expensive and/or popular products and/or services have been reviewed, it may be difficult to guarantee the actual purchase of the corresponding products and/or services by a reviewer.

SUMMARY

Embodiments of the present disclosure provide for guaranteeing an actual purchase of a product.

Embodiments of the present disclosure provide for identifying a purchase trend of platform users.

Embodiments of the present disclosure provide for maximizing a brand advertisement effect based on the purchase trend.

Embodiments of the present disclosure provide for a platform that rewards platform users in exchange for using the platform.

Embodiments of the present disclosure provide for a highly reliable social network service (SNS) that guarantees actual purchase of products to platform users.

According to an aspect of the present disclosure, a method of processing a token of a user by an electronic device is provided. The method includes receiving, from a user terminal, a message requesting to register the token. The token has been generated based on payment information of the user and a smart contract that uses the payment information. The method further includes registering the token, based on obtaining, from a blockchain network, a successful verification of the token. The method further includes updating a registration status of the registered token, based on the payment information. The method further includes determining whether to provide the user a reward for the registered token.

According to an aspect of the present disclosure, a method of generating a token of a user by an electronic device is provided. The method includes generating payment information of a transaction. The method further includes generating, based on a blockchain network, the token corresponding to the transaction. The token has been generated based on payment information and a smart contract that uses the payment information. The method further includes transmitting the token to a predetermined wallet address of a dashboard server. The payment information includes at least one of a payment status, a type of business to which the transaction belongs, a payment franchise, a payment amount, and at least one product purchased by the transaction.

Technical solutions of the present disclosure are not limited to the above-mentioned technical solutions, and other technical solutions which have not been mentioned may be clearly understood by those skilled in the art to which the present disclosure belongs from the following description.

BRIEF DESCRIPTION OF DRAWINGS

The above and other aspects, features, and advantages of certain embodiments of the present disclosure will be more apparent from the following description taken in conjunction with the accompanying drawings, in which:

FIG. 2 illustrates a computing device for implementing any one of the devices, according to an embodiment of the present disclosure;

FIG. 3A is a flowchart illustrating a token generation method, according to an embodiment of the present disclosure;

FIG. 8 is a flowchart illustrating a dashboard reception method, according to an embodiment of the present disclosure; and FIG. 9 is a flowchart illustrating a token generation method in accordance with payment information, according to an embodiment of the present disclosure.

DETAILED DESCRIPTION

Figure 1:
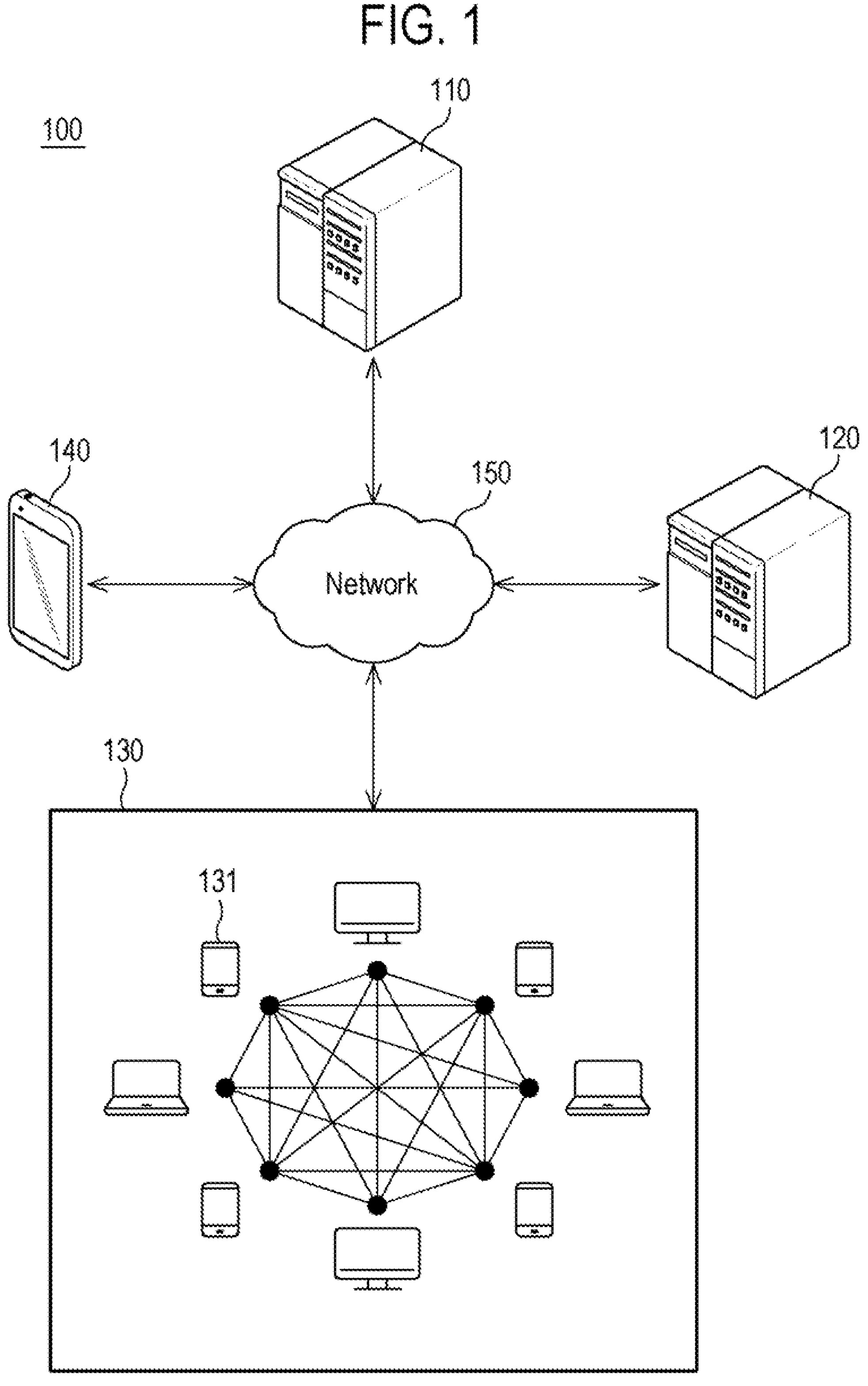
FIG. 1 illustrates an environment to which devices may be applied, according to an embodiment of the present disclosure.

Various embodiments disclosed in the present disclosure have been presented by way of example only to clearly describe the technical idea of the present disclosure, which are not intended to limit the embodiments to particular embodiment forms. The technical idea of the present disclosure includes various modifications, equivalents, and alternatives of respective embodiments disclosed in the present disclosure, and an embodiment selectively combined from all or some of the respective embodiments. Further, the scope of the technical idea of the present disclosure is not limited to the following various embodiments or the detailed description therefor.

The terms including technical or scientific terms used herein have meanings that are generally understood by a person having ordinary knowledge in the art to which the present disclosure pertains, unless otherwise defined.

The expressions "include," "may include," "provided with," "may be provided with," "have," "may have" and the like used herein may refer to the existence of target characteristics (e.g., functions, operations, elements, or the like) and do not exclude the existence of other additional characteristics. That is, the expressions should be understood as open-ended terms connoting the possibility of inclusion of other embodiments.

A singular expression used herein may include meanings of plurality, unless otherwise mentioned, and the same is applied to a singular expression recited in the claims.

The terms "first," "second," etc. as used herein may be used to identify a plurality of components from one another, and are not intended to limit the order or importance of the relevant components.

The expressions "A, B, and C," "A, B, or C," "at least one of A, B, and C," "at least one of "A, B, or C" or the like may include any one of, or all possible combinations of the listed items. For example, at least one of A or B may refer to any or all of (1) at least one A, (2), at least one B, and (3) at least one A and at least one B.

The expression "based on" as used herein may describe one or more factors that influence a decision, an action of judgment, or an operation described in a phrase or sentence including the relevant expression. Thus, the use of this expression may not exclude additional factors influencing the decision, the action of judgment, or the operation.

The expression that a certain component (e.g., a first component) is "coupled to" or "connected to" another component (e.g., a second component) may mean that the certain component is coupled or connected directly (e.g., wired) and/or indirectly (e.g., wirelessly) to the other component or that the certain component is coupled or connected to the other component via another new component (e.g., a third component).

The expression "configured to" as used in the present disclosure may be replaced with other expressions, such as, but not limited to, "set to," "having an ability to," "changed to," "made to," "capable of," or the like, according to the context. In addition, the expression is not limited to a meaning of "specially designed in hardware." For example, a processor configured to perform a particular operation may be a generic purpose processor capable of performing the particular operation by executing software or a special purpose computer structured through programming to perform the particular operation.

The expression "payment information" as used in the present disclosure may be generated to include various pieces of information on approved transactions. The approved transactions may refer to all transactions paid by cash, a credit card, a check card, a debit card, an easy payment means, or the like. Payment information may be generated in various schemes according to respective payment means. For example, payment information may be generated from a point of sale (POS) used by a franchise in a transaction based on cash. For another example, payment information may be generated from a server of a credit card company and/or a bank in a transaction based on various types of credit and/or debit cards. For yet another example, payment information may be generated from an easy payment server operating easy payment means in a transaction based on the easy payment means. Hereinafter, a server (e.g., a POS server, a credit card company server, a bank server, an easy payment server, or the like) capable of acquiring or generating payment information according to each payment means may be referred to as a "payment server." The payment information may include, as items, at least one of pieces of information on a type of business, a payment franchise, a payment time point, a payment amount, a payment location, a product to be paid for, or a payer. In addition, various pieces of information which may be acquired from an approved transaction may be included in the payment information, and other pieces of information which have not been mentioned in the above-described examples may be included in the scope of the present disclosure.

The term "non-fungible token" as used in the present disclosure may refer to a virtual token generated according to a smart contract with reference to a generation protocol (e.g., Ethereum request for comment (ERC)-20, ERC-721, ERC-1155, or the like). The non-fungible token may be recorded in a blockchain, which may be a distributed storage, and, thus, integrity may be maintained. The non-fungible token may be generated with a one-to-one correspondence to payment information, and, thus, a genuineness of the payment information may be guaranteed. In the present disclosure, the non-fungible token may be abbreviated as a "token." Further, in the present disclosure, a message making a request for generating a token may be referred to as a "generation request."

The term "smart contract" as used in the present disclosure may be a program and/or an application executed on a virtual machine operated by one or more nodes included in the blockchain network. The smart contract may comply with particular regulations (and/or protocols). For example, the smart contract may include one or more functions corresponding to respective protocols with reference to ERC-20, ERC-721, ERC-1155, or the like. However, various types of smart contracts may be made by inserting into the smart contract other functions that may not be included in the listed protocols, for example.

The term "dashboard server" as used in the present disclosure may be understood to be an operation server for operating a non-fungible token-based platform. For example, the platform may be understood to be an online space for providing social network services (SNS s).

The term "registration" as used in the present disclosure may refer to an action of fixing a status of the token according to a scheme defined in the smart contract with respect to the token generated based on the payment information. In some embodiments, an owner of the token may receive a predetermined reward in exchange for an action of fixing the status of the token. That is, the fixing of the status of the token may include temporarily preventing a transaction involving the token and/or temporarily preventing the circulation of the token. For example, registration may refer to a series of operations in which the token generated using payment information is deposited in a staking address within the blockchain network that has been defined according to the smart contract for a predetermined time period and in which the user receives a reward according to the deposit. As such, the registration operation, according to the example, may also be referred to as a "staking" operation. In some embodiments, a platform operator may change a condition required for providing the reward or the content of the reward (e.g., a period required for registration) by configuring the smart contract of desired content.

In another example, the registration operation may refer to a series of operations in which information included in the token may be transmitted to at least one node of the blockchain network without any deposit of the token and, thus, the information included in the token may be recorded in the blockchain according to the smart contract and in which the user receives the reward according to the record. In an embodiment, the information included in the token may include at least one piece of information on the token itself (e.g., a token name, token identification information, a time point at which the token is generated, a token owner, a token image, or the like) or payment information used for generating the token. For example, the platform operator may change the condition required for providing the reward or the content of the reward by configuring the smart contract of the desired content. In the present disclosure, a message making a request for registering the token may be referred to as a "registration request."

Hereinafter, various embodiments disclosed in the present disclosure are described with reference to the accompanying drawings. In the accompanying drawings and description of the drawings, the same reference numeral may be assigned to the same or substantially equivalent elements. Further, in the following description of various embodiments, overlapping explanation of the same element or a corresponding element may be omitted, but it does not mean that the element is not included in the embodiment.

FIG. 1 illustrates an environment to which devices may be applied, according to an embodiment of the present disclosure. The environment 100 may include a dashboard server 110, a payment server 120, a blockchain network 130 including one or more nodes 131, or a user terminal 140. FIG. 1 illustrates just one example of an environment architecture in which the user terminal 140 and eight nodes 131 are connected to the dashboard server 110 through the network 150. However, the present disclosure is not limited in this regard. That is, those of skill in the art may appreciate that the specific environment architecture used may vary and is secondary to the functionality that the environment 100 provides, as further described herein. For example, a particular environment 100 may comprise a single physical machine for the dashboard server 110 and the payment server 120 and/or may comprise more than one user terminal 140.

The dashboard server 110 may be a server that implements a platform for providing an SNS based on a non-fungible token. The dashboard server 110 may perform various processing for the non-fungible token. In an embodiment, the dashboard server 110 may manage wallet addresses storing tokens of users. Alternatively or additionally, the dashboard server 110 may perform processing related to registration in response to a registration request. For example, the dashboard server 110 may configure, as a dashboard, a registration status that has changed based on processing related to the registration. In optional or additional embodiments, the dashboard server 110 may perform various operations (e.g., communication between users) generally required for an SNS platform. Alternatively or additionally, the dashboard server 110 may be involved in registration of tokens by interacting with the nodes 131 included in the blockchain network 130.

The dashboard server 110 may be implemented as one or more computing devices. For example, all functions of the dashboard server 110 may be implemented by a single computing device. In another example, a first function of the dashboard server 110 may be implemented by a first computing device and a second function may be implemented by a second computing device. The computing device may include a desktop computer, a laptop computer, an application server, a proxy server, a cloud server, or the like, but is not limited thereto and may include various types of devices having a computing function.

The payment server 120 may perform various processing for payment of a transaction and/or payment information corresponding to the payment. For example, the payment server 120 may generate payment information on a transaction of the user. For example, the payment server 120 may perform a procedure of generating a token according to the payment information. That is, the payment server 120 may be involved in the generation of the token by interacting with the nodes 131 included in the blockchain network 130.

The payment server 120 may be implemented as one or more computing devices. For example, all functions of the payment server 120 may be implemented by a single computing device. In another example, a first function of the payment server 120 may be implemented by a first computing device and a second function may be implemented by a second computing device. The computing device may include a desktop computer, a laptop computer, an application server, a proxy server, a cloud server, or the like, but is not limited thereto and may include various types of devices having a computing function.

The node 131 may be one of the devices of individual participants participating in the blockchain network 130. The node 131 may be one component of the blockchain network 130. The node 131 may perform calculations for maintaining a blockchain of the blockchain network 130. For example, a random node 131 of the blockchain network 130 may generate a new block of the corresponding blockchain. The new block may be shared between different nodes 131 of the blockchain network through a process of distributed consensus. Alternatively or additionally, the new block may be connected to a next block of the blockchain. That is, the node 131 may perform an operation of generating, verifying, and/or spreading a transaction and a block in which the transaction is recorded. The node 131 may be referred to as a full node, a light node, a master node, a mining node, a random node, a baking node, a super node, or the like, according to the operation performed by the node 131. The node 131 may generate a token by interacting with the payment server 120. Alternatively or additionally, the node 131 may register a token by interacting with the dashboard server 110.

The node 131 may be implemented as a computing device. For example, the computing device may include a desktop computer, a laptop computer, a server, or the like, but is not limited thereto and may be various types of devices having a computing function.

The user terminal 140 may be a terminal of a user using a non-fungible token-based platform. The user may use various functions provided by the platform through the user terminal 140. For example, the user may make a request for registering a token, identify a dashboard that virtualizes a registration status, and/or communicate with another user through the user terminal 140. In order to enable respective users to use the SNS platform, a web browser and/or a dedicated application may be installed in the user terminal 140. The user terminal 140 may include devices, such as a desktop computer, a workstation, a laptop computer, a tablet computer, an audio player, a wearable device, and a smartphone, but is not limited to the examples and may include various types of computing devices having a computing function.

The dashboard server 110, the payment server 120, the node 131, and the user terminal 140 may communicate through the network 150. The network 150 may be implemented as a wired network, as a wireless network, or as a combination thereof. The network 150 may include one or more networks such as, but not limited to, a private network, a corporate network, a local area network (LAN), a wide area network (WAN), a mobile communication network (e.g., mobile radio communication network), a wireless broadband internet (Wibro), the Internet, and a combination thereof.

In some embodiments, the dashboard server 110, the payment server 120, the node 131, and the user terminal 140 may indicate functionally separate elements. That is, two or more components may be implemented in an integrated form in a real physical environment. For example, the dashboard server 110 and the node 131 included in the blockchain network 130 may be implemented in the form of different logics (e.g., virtual machines, software and/or programs) within a same computing device. That is, the dashboard server 110 may be implemented to operate as the node 131 of the blockchain network 130. For another example, the payment server 120 and the node 131 included in the blockchain network 130 may be implemented in the form of different logics (e.g., virtual machines, software and/or programs) within the same computing device. That is, the payment server 120 may be implemented to operate as the node 131 of the blockchain network 130.

Figure 2:
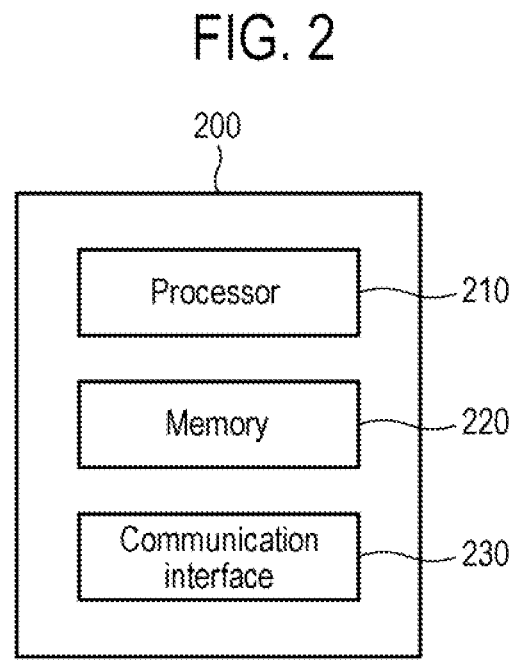

FIG. 2 illustrates a computing device 200 capable of implementing one of the devices, according to an embodiment of the present disclosure. According to the present disclosure, the computing device 200 may be expressed as an electronic device, and the computing device 200 and the electronic device may be interchangeable. In an embodiment, the dashboard server 110, the payment server 120, the node 131, and the user terminal 140 may be implemented by a corresponding computing device.

The computing device 200 may include one or more processors 210 and/or one or more memories 220. In an embodiment, some elements of the computing device 200 may be omitted and/or other elements (e.g., a display or the like) may be added to the computing device 200. Further, some elements may be implemented to be additionally or alternatively integrated and/or implemented as a single entity and/or a plurality of entities. According to the present disclosure, the one or more processors 210 may be expressed as a processor 210. That is, the expression "processor 210" may refer to a set of one or more processors, unless clearly expressed differently in the context. Further, according to the present disclosure, one or more memories 220 may be expressed as a memory 220. That is, the expression "memory 220" may refer to a set of one or more memories 220 unless clearly expressed differently in the context.

Although not shown, at least some elements within the computing device 200 may be connected to each other through a bus, general purpose input/output (GPIO), a serial peripheral interface (SPI), a mobile industry processor interface (MIPI), or the like and exchange data or signals.

The processor 210 may perform calculations and/or data processing about the control and/or communication of respective elements of the computing device 200. For example, the processor 210 may control at least one element of the computing device 200 connected to the processor 210 by operating software (e.g., instructions, programs, or the like) received from another element. For example, the processor 210 may load instructions and/or data to the memory 220, process the instructions and/or data stored in the memory 220, and store resulting data according to the processing in the memory 220. Alternatively or additionally, the processor 210 may be operatively connected to the elements of the computing device 200 and may perform various calculations and processing, generating and processing data, and the like related to the present disclosure.

The memory 220 may store various pieces of data. The data stored in the memory 220 may be acquired, processed, or used by at least one element of the computing device 200 and may include software (e.g., instructions, programs, and the like). As an example, the memory 220 may store instructions for the operation of the processor 210 as a computing program. The computer program may include one or more instructions causing the processor 210 to perform the operation according to various embodiments of the present disclosure when loaded into the memory 220. That is, the processor 210 may perform operations according to various embodiments of the present disclosure by executing the one or more instructions. Alternatively or additionally, the memory 220 may include a volatile memory and/or nonvolatile memory. In an embodiment, the instruction and/or program may be software stored in the memory 220 and may include, but not be limited to, an operating system for controlling resources of the computing device 200, an application, middleware for providing an application with various functions to allow the application to use resources of the computing device 200, and the like.

In an embodiment, the computing device 200 may include a communication interface 230. The communication interface 230 may establish a wired and/or wireless communication channel with an external device (e.g., the node 131, the user terminal 140) and transmit and/or receive various pieces of data to and/or from the external device. In an embodiment, the communication interface 230 may include at least one port to be connected with the external device through a wired cable in order to communicate with the external device. In this case, the communication interface 230 may communicate with the external device connected through the at least one port. In an optional or additional embodiment, the communication interface 230 may include a cellular communication module and may be configured to be connected to a cellular network (e.g., 3G, Long Term Evolution (LTE), 5G, Wibro, or worldwide interoperability for microwave access (Wimax)).

In an embodiment, the communication interface 230 may include a short-range communication module and transmit and/or receive data to and/or from the external device through short-range communication (e.g., Wireless-Fidelity (Wi-Fi), Bluetooth, Bluetooth low energy (BLE), or ultra-wideband (UWB)). In an optional or additional embodiment, the communication interface 230 may include a noncontact communication module for noncontact communication. The noncontact communication may include proximity communication technology in at least one noncontact scheme such as, but not limited to, near field communication (NFC), radio frequency identification (RFID) communication, and magnetic secure transmission (MST) communication. Alternatively or additionally, the computing device 200 may be implemented in various schemes known for communication with the external device, and the scope of the present disclosure is not limited by the above-described examples.

In an embodiment, the computing device 200 may include a display (not shown). The display may display various screens based on the control of the processor 210. That is, the display may display a dashboard that visualizes registration statuses of platform users based on the control of the processor 210. For example, a web browser and/or a dedicated application may be installed in the computing device 200 to display the dashboard on the display. In an optional or additional embodiment, the web browser and/or the dedicated application may be configured to provide the user with a registration request function and/or a communication function with another user through a user interface. Alternatively or additionally, the display may be capable of interacting with the user and may display various screens based on the control of the processor 210 and receive a user input from the user. In some embodiments, the display may be implemented in the form of a touch sensor panel (TSP) capable of recognizing contact or proximity of various external objects (e.g., a finger, a stylus, and the like). The TSP may have various structures and types, and the present disclosure may be applied to all TSP regardless of the structure and the type thereof.

In an embodiment, the computing device 200 may include an input device (e.g., a mouse, a keyboard, or the like). The input device (not shown) may receive data to be used by an element (e.g., the processor 210) of the computing device 200 from outside of the computing device 200 (e.g., the user).

Figure 3A:
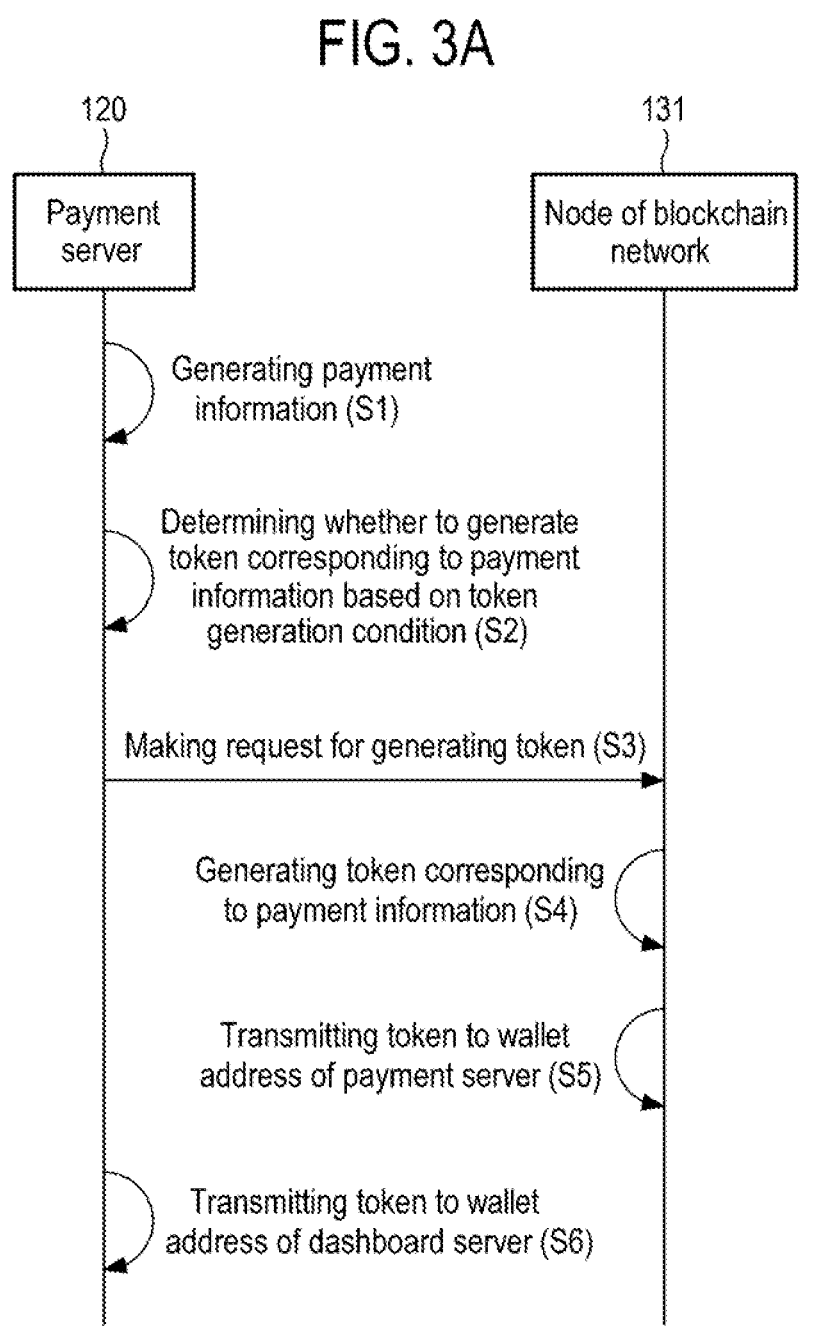

FIG. 3A is a flowchart illustrating a token generation method, according to an embodiment of the present disclosure. Referring to FIG. 3A, although operations of the token generation method are illustrated as being performed by a particular entity, the entity performing the operation may change according to design constraints imposed on the overall system. For example, the payment server 120 may be integrated with the node 131 of the blockchain network 130 and may perform the operations designated to be performed by the payment server 120 and the node 131.

As the user conducts a transaction using a payment means (e.g., cash, a credit card, a check card, a debit card, or an easy payment means), the payment server 120 may generate payment information in operation S1. For example, the payment server 120 may acquire information on the transaction of the user and process the information on the transaction, so as to generate payment information. Various pre-processing operations may be applied to processing of the information. For example, the pre-processing operations may include an operation of extracting a portion of the information on the transaction, changing an expression format of the information, and/or modifying a portion of the information on the transaction. The generated payment information may include various pieces of information on the transaction as items. For example, the payment information may include, but not be limited, information on a type of business corresponding to an approved transaction, a payment franchise, a payment time point, payment amount, a payment location, a product to be paid, a payer, or the like.

The payment server 120 may determine whether to generate a token corresponding to the payment information based on a predetermined token generation condition in operation S2. That is, the payment server 120 may initiate a token generation procedure that may include generating the token by determining whether the payment information satisfies the predetermined token generation condition which may be a condition for generating the token.

In an embodiment, the payment server 120 may determine whether the type of business included in the payment information corresponds to a predetermined type of business and determine the generation of the token according to the determination indicating that the type of business corresponds to the predetermined type of business (e.g., beverage, clothing, travel, or the like). That is, when the token generation condition is determined to generate the token only when the payment means is used for a particular type of business, the token generation procedure may be initiated only when the payment information is generated using the payment means for the particular type of business.

In an optional or additional embodiment, the payment server 120 may determine whether the payment amount is greater than or equal to a predetermined amount and generate a token according to the determination indicating that the payment amount is greater than or equal to the predetermined amount. That is, when the token generation condition is determined to generate a token only when the payment means is used for payment greater than or equal to the predetermined amount, the token generation procedure may be initiated only when the payment information is generated using the payment means for the payment greater than or equal to the predetermined amount. Alternatively or additionally, the payment server 120 may determine whether the payment amount is less than another predetermined amount and generate a token according to the determination indicating that the payment amount is less than the another predetermined amount. That is, when the token generation condition is determined to generate a token only when the payment means is used for payment less than the another predetermined amount, the token generation procedure may be initiated only when the payment information is generated using the payment means for the payment less than to the another predetermined amount.

In another embodiment, the payment server 120 may determine whether a payment status is valid and determine the generation of the token according to a determination indicating that the payment status is valid. The payment status may refer to a status of payment progress (e.g., payment approval, payment cancellation, payment completion, or the like). Validity of the payment status may be variously defined according to the status of payment progress. Since the payment status changes according to the time-series flow, a time point at which the token generation procedure is initiated may be controlled according to the definition of validity of the payment status. For example, validity of the payment status may be a payment approval status. In this case, when payment is approved, the token generation procedure may be immediately initiated and the token may be rapidly generated. In another example, validity of the payment status may be a payment completion status. In this case, as the token generation procedure is initiated when payment is completed, it may possible to prevent cheating by repeating payment approval and cancellation to maliciously generate a token.

When it is determined to initiate the token generation procedure, the payment server 120 may transmit a token generation request to the node 131 of the blockchain network 130 in operation S3. This operation may be understood as an operation in which the payment server 120 executes a smart contract for the generation of the token with the node 131. In some embodiments, the token generation request may be accompanied with transmission of payment information generated as a result of operation S1 of generating the payment information. Accordingly, the token may be generated through the use of the payment information accompanied with the generation request. Alternatively or additionally, when the payment server 120 operates as the node 131, operation S3 may be omitted.

In an embodiment, the transmitted payment information accompanied with the token generation request may include only some of a plurality of items included in the payment information generated as a result of operation S1 of generating the payment information. For example, the transmitted payment information accompanied with the token generation request may not include information on payment account among the plurality of items. In another example, the transmitted payment information accompanied with the token generation request may include only information on a type of business, a payment franchise, and a payer.

The node 131 may generate a token corresponding to the transmitted payment information accompanied with the token generation request in response to the token generation request in operation S4. This operation may be understood as an operation in which the node 131 executes a smart contract for the generation of the token. That is, operation S4 may be understood as an operation in which one or more nodes included in the blockchain network 130 perform verification work for the payment information through a blockchain consensus algorithm and, when the verification is completed, perform an operation of recording the verified payment information as the token in one block of the blockchain. As the verification work is performed for the generation of the token through the consensus algorithm, legality (e.g., legitimacy and/or authenticity) of the generation of the token may be guaranteed. Further, based on the legality of the generated token, the actual purchase history of the user included in the token as the payment information may be guaranteed.

In an embodiment, the operation of generating the token may include determining an image (e.g., a token image) corresponding to a transaction. That is, a function of defining the corresponding relationship between some items of the transmitted payment information accompanied with the token generation request and the image may be included in the smart contract. The node 131 may generate a token image by executing the smart contract. Alternatively or additionally, the function of defining the corresponding relationship between some items of the payment information and the image may not be included in the smart contract. In this case, the payment server 120 may determine an image and transmit the determined image accompanied with the token generation request in operation S3 of making the request for generating the token, and the node 131 may determine a token image by using the image.

In an embodiment, one item of the payment information and the image may have one-to-one corresponding relationship. For example, information on a payment franchise A and an image A of the payment franchise A may have a one-to-one correspondence relationship, and when the payment information includes the information on the payment franchise A, the image corresponding to the payment information may be determined as the image A. In this case, tokens indicating the image A may be generated for users having transactions in the payment franchise A.

In an optional or additional embodiment, the image may be determined in consideration of a plurality of items included in the payment information. For example, the image A may be determined as the image corresponding to the payment information when payment amount is ₩N won (where N is a positive integer greater than one (1)) or lower in consideration of both information on the payment franchise A and information on payment amount paid in the payment franchise A, and the image B may be determined as the image corresponding to the payment information when payment amount is higher than ₩N won. In this case, even though a transaction approved in the payment franchise A proceeds in the payment franchise A, a token indicating an image may be determined differentially according to the payment amount.

The node 131 may transmit the generated token to a wallet address of the payment server 120 in operation S5. The payment server 120 may transmit the token received at the wallet address to a wallet address of the dashboard server 110 in operation S6. The token transmitted to the wallet address of the dashboard server 110 may be transmitted to the wallet address of the dashboard server 110 and stored or managed, but an owner of the token may be a user performing the payment. As the token is initially issued at the wallet address of the payment server 120 which manages payment information transmitted to the dashboard server 110, according to the embodiment, the transparency in issuing the token guaranteeing the actual purchase of the product or service may be secured. For transmission of the token, various known technologies may be referred to, and operations of transmitting the token to the predetermined wallet address may be included in the scope of the present disclosure. In an embodiment, the dashboard server 110 may transmit the token transmitted to the wallet address of the dashboard server 110 to a wallet address of the user (not shown).

Figure 3B:
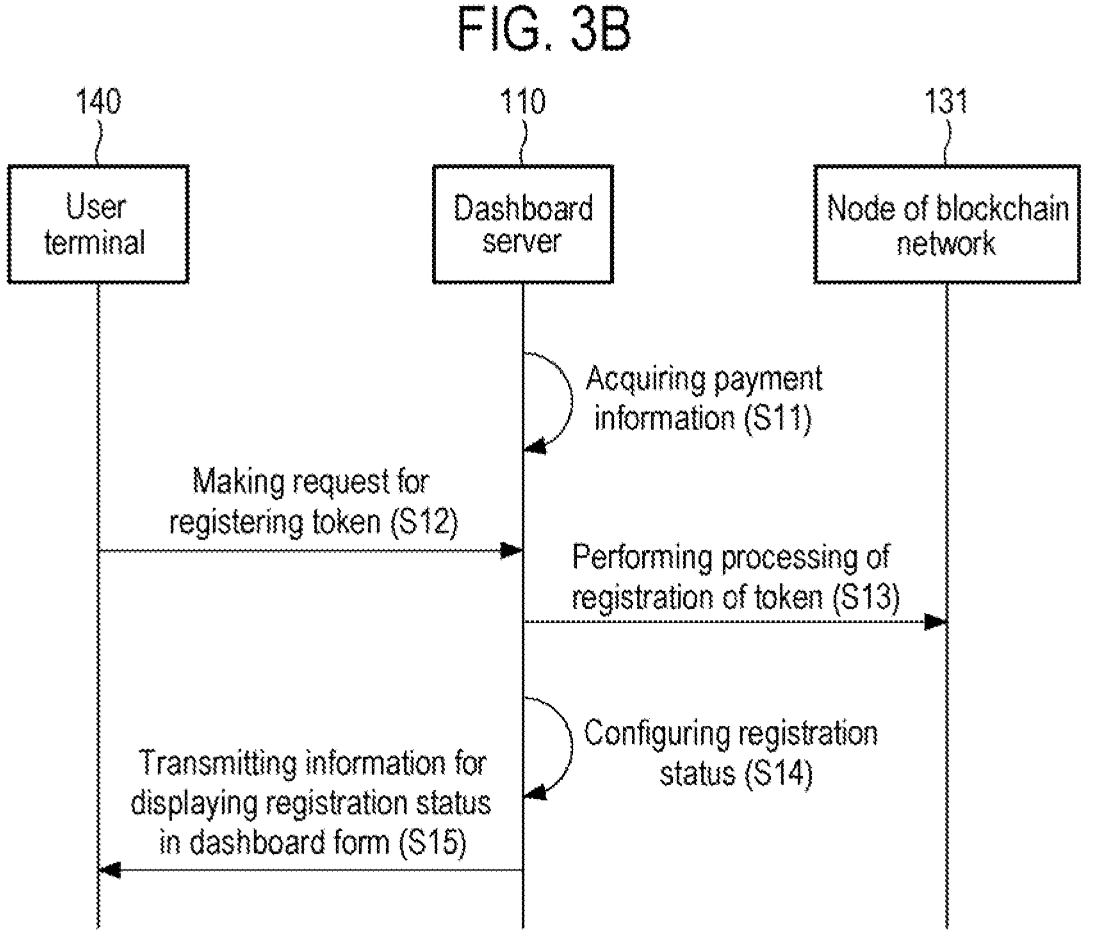
FIG. 3B is a flowchart illustrating a token registration method, according to an embodiment of the present disclosure.

FIG. 3B is a flowchart illustrating a token registration method, according to an embodiment of the present disclosure. Referring to FIG. 3B, although operations of the token registration method are illustrated as being performed by a particular entity, the entity performing the operation may change according to design constraints imposed on the overall system. For example, the payment server 120 may be integrated with the node 131 of the blockchain network 130 and may perform the operations designated to be performed by the payment server 120 and the node 131.

The dashboard server 110 may acquire payment information issued to correspond to the transaction in operation S11. In an embodiment, the dashboard server 110 may acquire payment information by searching for a block in which the token is recorded. In this case, as the block in which the token is recorded is searched by the dashboard server 110 without execution of the transaction in the blockchain network, the payment information may be acquired. In an optional or additional embodiment, the dashboard server 110 may acquire payment information generated according to operation S1 of generating the payment information from the payment server 120.

In an embodiment, operation S11 may include an operation in which the dashboard server 110 identifies a user account corresponding to the payment information. The user account may be an account corresponding to the user within the platform operated by the dashboard server 110. For example, the dashboard server 110 may compare information on the payer included in the payment information with information on the user account so as to identify the account server corresponding to the payment information. According to the embodiment, through the identification of the user account, information on the token (e.g., a token image or payment information) issued to the user account of the user performing the payment may be displayed. Alternatively or additionally, through the identification of the user account, a user that is to receive a reward according to satisfaction of a reward condition of an event may be identified. The event is further described below.

In connection with operation S11 of acquiring the payment information, FIG. 3B illustrates an example of performing operation S11 of acquiring the payment information before operation S12 of transmitting a registration request described below. However, the present disclosure is not limited in this regard. That is, the operation S11 of acquiring the payment information may be performed after the operation S12 of transmitting the registration request.

The user terminal 140 may transmit a token registration request to the dashboard server 110 in operation S12. As the token is generated to correspond to the payment information and transmitted to the wallet address of the dashboard server 110, the token may refer to a token possessed by the user using the user terminal 140.

For example, the user terminal 140 may receive information on the token generated to correspond to the payment information. That is, the user identifies the information on the token by accessing the user account of the platform using the user terminal 140. Alternatively or additionally, the user terminal 140 may display the information on the token on the user terminal 140. In an embodiment, the user terminal 140 may transmit a token registration request to the dashboard server 110 based on a user input for the information on the token. The information on the token may include a token image or payment information corresponding to the token. The user input may be an action (e.g., a tap, a double tap, or the like) defined for the token image.

The dashboard server 110 may process the registration in response to the registration request in operation S13. That is, the dashboard server 110 may perform processing of the registration by executing a smart contact in which the registration in the node 131 of the blockchain network 130 is defined. For example, the dashboard server 110 may perform processing of the registration by executing a smart contract of depositing the token corresponding to the registration request in a staking address. In another example, the dashboard server 110 may perform processing of the registration by executing a smart contract of recording information included in the token corresponding to the registration request in one block of the blockchain. When the dashboard server 110 operates as the node 131, the dashboard server 110 may perform processing of the registration by executing the smart contract in which the registration is defined.

In an embodiment, the executed smart contract accompanied with processing of the registration may include a function of verifying legality of the token. For example, the function may verify legality of the token by inquiring about a location at which the token may be recorded in the blockchain. The legally issued token may be recorded in a location (e.g., a particular block) defined in the blockchain. Thus, legality of the token may be verified through an inquiry about the location in which the token is recorded. In another example, the function may verify legality of the token by inquiring about a format of information included in the token. That is, with respect to an illegal token generated by a protocol different from the protocol in operation S4 of generating the token, a format of information included in the token may be different from a format of information included in the legal token, and thus the legality of the token may be verified through an inquiry about the format of the information included in the token.

According to an embodiment, processing of the registration for the legal token may be performed, and processing of the registration for the illegal token may not be performed (e.g., may be prevented). In the present disclosure, a series of processing for verifying legality of the token accompanied with processing of the registration may be referred to as verification of the blockchain network. That is, according to an embodiment, processing of the registration of the token may be performed based on a verification of the blockchain network.

In an embodiment, the dashboard server 110 may calculate the number of tokens, which are not registered (hereinafter, referred to as "distribution tokens"), by comparing the number of tokens transmitted to the wallet address of the dashboard server 110 in operation S6 with the number of tokens for which processing of the registration is performed in operation S13. According to the number of calculated distribution tokens, the dashboard server 110 may determine a reward condition of an event as described below.

The dashboard server 110 may configure a registration status based on the payment information in operation S14. That is, the dashboard server 110 may configure the registration status only for the registration-processed token and configure the registration status to display transactions corresponding to the registration-processed tokens on the user terminal 140 in a dashboard form by using the payment information acquired as a result of operation S11 of acquiring the payment information. For example, the dashboard may include one or more regions which display information on the token. The one or more regions may be regions separated based on a type of business to which a transaction corresponding to the token belongs or a payment franchise in which the transaction is performed.

In an embodiment, the dashboard server 110 may configure the registration status only for at least some of the information on the tokens generated to correspond to the payment information. As at least some of the received information on the tokens may be omitted according to the embodiment, the dashboard server 110 may select and provide intuitive information on the token to the user using the user terminal 140.

The dashboard server 110 may transmit information for displaying the registration status on the user terminal 140 in the dashboard form to the user terminal 140 in operation S15. The user terminal 140 may display the registration status on the display of the user terminal 140 in the dashboard form based on information transmitted by the dashboard server 110. For example, the user terminal 140 may receive an image indicating the dashboard from the dashboard server 110 and display the received image on the display. In another example, the user terminal 140 may receive information other than the image from the dashboard server 110, process the received information to generate the image indicating the dashboard, and display the generated image on the display.

Figure 4:
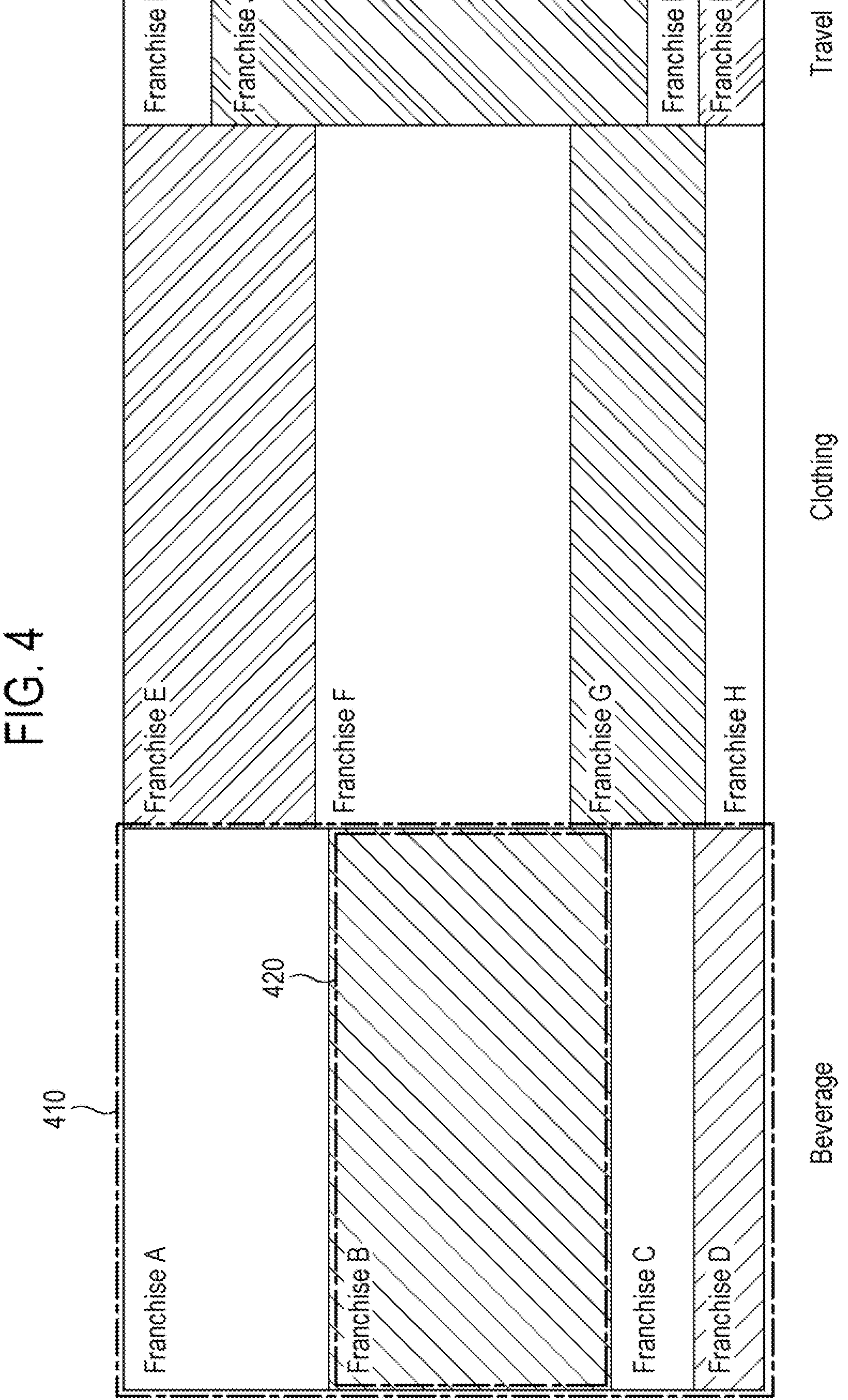
FIG. 4 illustrates a dashboard, according to an embodiment of the present disclosure.

FIG. 4 illustrates a dashboard, according to an embodiment of the present disclosure. In the present disclosure, the dashboard may be a screen visually displaying information and/or data on the registration-processed token and may include one or more graphs, diagrams, or images. In an embodiment, the dashboard may include a plurality of regions. The plurality of regions may be separated according to types of business (e.g., beverage, clothing, travel, and the like) and/or payment franchises. For example, a beverage region 410 may be a region indicating a registration status of tokens corresponding to a beverage type among a plurality of types of business. For example, a franchise B region 420 may be a region indicating a registration status of tokens corresponding to the franchise B of the beverage type.

In an embodiment, an area of each of the plurality of regions may be determined based on the number of registered tokens. For example, when the area of the region within the dashboard is relatively large, the number of tokens related to the corresponding region among the tokens registered in the registration address may be relatively large, and when the area is relatively small, the number of tokens related to the corresponding area among the registered tokens may be relatively small. In an optional or additional embodiment, the area of each of the plurality of regions may be proportional to a sum of payment amounts of the payment information corresponding to the registered tokens.

By displaying the dashboard on the user terminal 140, the user may identify purchase trends of other users using the platform and/or a company may maximize a marketing effect by doing marketing to expand the area of the region within the dashboard related to the company.

The dashboard in FIG. 4 illustrates a registration status according to two references (e.g., the type of business and the payment franchise), but may visualize the registration status according to one or three references. Further, the registration status may be indicated based on a reference different from the references in FIG. 4. That is, FIG. 4 illustrates a non-limiting example of a dashboard and other dashboards comprising a different quantity of regions and/or franchises that may be been selected based on a different set of references may be implemented without deviating from the scope of the present disclosure.

In an embodiment, the dashboard server 110 may configure the registration status to add payment information to one of the plurality of regions included in the dashboard based on the type of business related to payment indicated by the payment information. For example, when the registration-processed token is a token corresponding to the beverage type, payment information corresponding to the corresponding token may be added to the beverage region 410. When the area of the beverage region 410 is determined based on a total amount related to beverage, the payment information may be added, and thus a payment amount within the corresponding payment information may be added to the total amount. Accordingly, the beverage region 410 may increase. Alternatively or additionally, according to the increase in the area of the beverage region 410, areas of other regions (e.g., a clothing region and a travel region) may relatively decrease. That is, a total area of the dashboard may be maintained, and areas of the regions included in the dashboard may be determined according to a total number of pieces of payment information corresponding to respective regions or a ratio of the total amount.

In an optional or additional embodiment, the dashboard server 110 may configure the registration status to add the payment information to one region among the plurality of regions included in the dashboard based on the payment franchise related to payment indicated by the payment information. For example, when the registration-processed token is a token corresponding to the franchise B, payment information corresponding to the token may be added to the B franchise region 420. When the area of the franchise B region 420 is determined based on the total amount of payment in the franchise B, payment information may be added, and thus the payment account within the corresponding payment information may be added to the existing total payment amount. Accordingly, the area of the franchise B region 420 may increase. Alternatively or additionally, according to the increase in the area of the franchise B region 420, areas of other regions (e.g., a franchise A region, a franchise C region, and a franchise D region) may decrease relatively. That is, a total area of the dashboard may be maintained, and areas of the regions included in the dashboard may be determined according to a total number of pieces of payment information corresponding to respective regions or a ratio of the total amount.

Figures 5, 6:
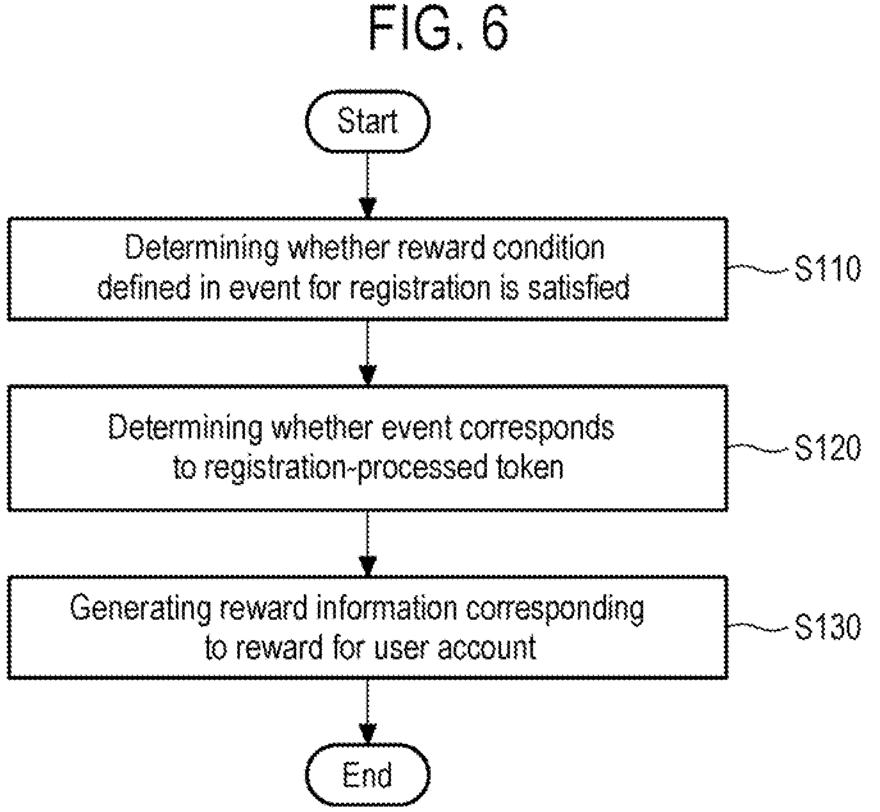
FIG. 5 illustrates an expanded region of a dashboard, according to an embodiment of the present disclosure.
FIG. 6 is a flowchart illustrating a reward information generation method based on an event, according to an embodiment of the present disclosure.

FIG. 5 illustrates a region 500 in which a dashboard expands, according to an embodiment of the present disclosure. The region 500 illustrated in FIG. 5 may be understood as a diagram expanding, for example, the franchise B region 420 of FIG. 4. The region 500 may include one or more pieces of payment information 510. The payment information 510 may correspond to the registration-processed token. For example, the payment information 510 may include a token image 511 corresponding to the token and information 512 indicating a user account.

As illustrated in FIG. 5, by displaying the payment information 510 displayed on the dashboard through the token image 511 and the information 512 indicating the user account, information indicating that the user actually purchased the corresponding product may be displayed on the dashboard. The token image 511 may an image related to payment information and may refer to various images for the payment franchise. For example, the token image 511 may be an internal image of the payment franchise, an external image of the payment franchise, an image for a product and/or service purchased in the payment franchise, or the like. For example, when beverage is paid, the token image may be a photo and/or a picture of a beverage. The dashboard may be displayed to be linked with registration of the token in which the token is capable of guaranteeing genuineness (e.g., legality) of the payment information. Thus, the dashboard may provide to the users a reliable platform indicating the actual purchase of the product to the users.

According to various embodiments, the region 500 of the dashboard may be implemented to display the payment information 510 in a form different from that illustrated in FIG. 5, and items included in the payment information 510 may vary according to an actual implementation and/or design constraints imposed on the system. In an embodiment, the dashboard server 110 may further include information other than the payment information to configure the region 500 of the dashboard.

FIG. 6 is a flowchart illustrating a reward information generation method based on an event, according to an embodiment of the present disclosure. In an embodiment, the reward information generation method may be performed by the dashboard server 110 and/or a computing device having a functionality of the dashboard server 110.

The dashboard server 110 may determine whether a reward condition defined in an event for registration is satisfied in operation S110. The event may be an online event held by a platform operator. That is, the event may be an event exposed to the dashboard that may provide rewards to users according to registration participation. For example, the reward may be a virtual asset and/or a coupon corresponding to the event. The reward condition may be based on at least one of pieces of information on a type of business, a payment franchise, a payment time point, and a payment amount. For example, the reward condition may be a condition indicating that the number of registrations of the business type A is N or more times for a predetermined time period, where N is a positive integer greater than zero (0). Alternatively or additionally, the reward condition may be a condition indicating that a payment amount of the payment franchise A is WM won or higher for a predetermined time period, where M is a positive integer greater than zero (0). In some embodiments, the reward condition and the reward corresponding to the reward condition may be displayed on the dashboard and, thus, may encourage active participation of the user. The dashboard server 110 may determine whether to provide the reward by determining whether the reward condition has been satisfied.

When it is determined that the reward condition has been satisfied, the dashboard server 110 may determine whether the event corresponds to the registration-processed token in operation S120. That is, when payment of the user corresponding to the registration-processed token (e.g., payment in the business type A) is relevant to the reward condition of the corresponding event (e.g., when the number of registrations for the business type A is N times or more), the dashboard server 110 may determine to perform registration of the corresponding token and/or that the corresponding token corresponds to the event. Such a determination process may include determining whether the user participates in the event through registration of the particular token.

The dashboard server 110 may generate reward information corresponding to a reward for a user account corresponding to the token according to determination that the event corresponds to the registration-processed token in operation S130. The reward information may be information displayed for the user account in the platform. For example, the reward information may be information indicating 5 Ether (ETH or Ξ). In such an example, as the reward information is generated for the user account, the corresponding user may acquire 5 ETH by participating in the event.

In an embodiment, the reward may be based on the number of users registering tokens corresponding to the event. For example, the reward may be provided to all users participating in registration corresponding to the event. In such an example, when a total reward is predetermined, the same reward may be provided to the users participating in the event. Alternatively or additionally, the total reward may be equally divided among the users participating in the event.

In an optional or additional embodiment, the reward may be based on the registration order of the registered tokens satisfying the reward condition of the event. That is, the reward may be differentially provided according to the order of participation in the registration corresponding to the event. For example, if the total reward is predetermined and a plurality of users participate in the event, a reward that may be provided to an individual user may be small (e.g., if assigned equally), and thus the reward may be differentially assigned according to the order of participation in the registration.

Referring to FIG. 6, users of the platform may pay for products for satisfying the reward condition corresponding to the event and may actively participate in registration of tokens generated according to the payment in order to acquire the reward. As described above, it may possible to maximize an advertising effect of a type of business or a brand corresponding to the event by inducing active participation of the users.

Figure 7:
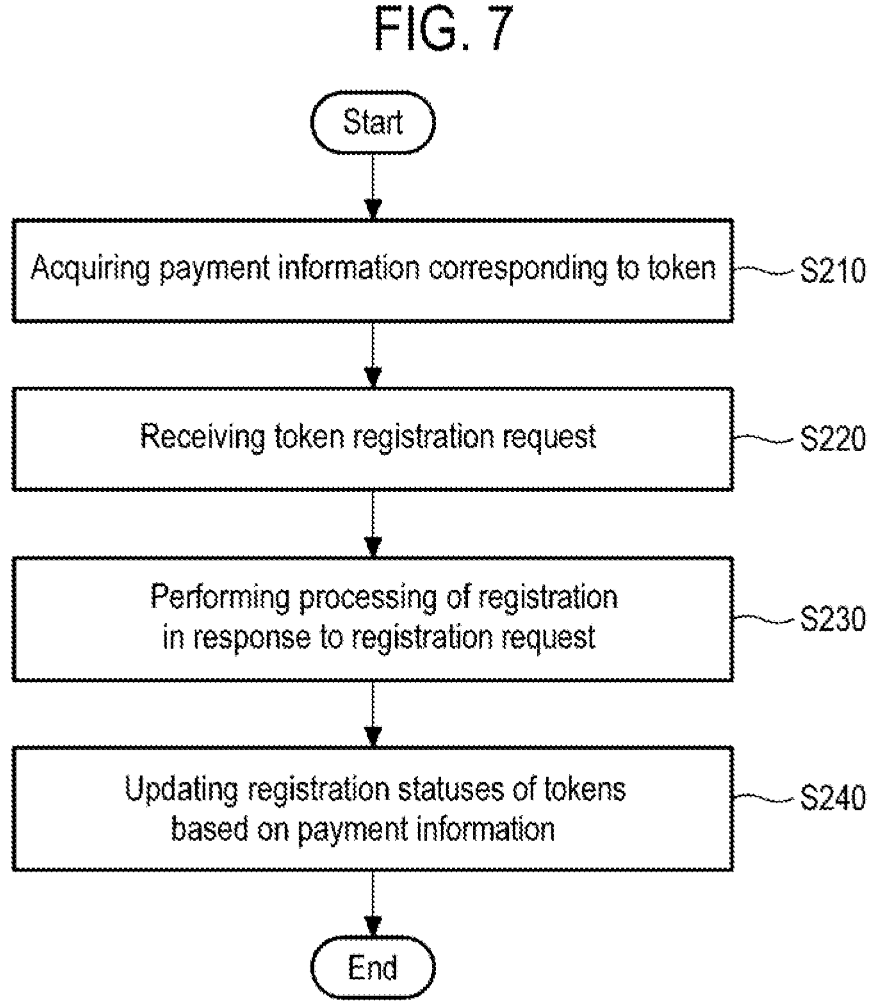
FIG. 7 is a flowchart illustrating a dashboard update method, according to an embodiment of the present disclosure.

FIG. 7 is a flowchart illustrating a dashboard update method, according to an embodiment of the present disclosure. In an embodiment, the dashboard update method may be performed by the dashboard server 110 and/or a computing device having a functionality of the dashboard server 110.

The dashboard server 110 may acquire payment information corresponding to the token in operation S210. Operation S210 may include or may be similar in many respects to operation S11 of FIG. 3B, and may include additional features as described below.

In an embodiment, operation S210 in which the dashboard server 110 acquires payment information may include an operation in which the dashboard server 110 identifies a user account corresponding to the payment information. That is, the dashboard server 110 may compare information on the payer included in the payment information with information on the user account so as to identify the account server corresponding to the payment information.

The dashboard server 110 may receive a token registration request in operation S220. Operation S220 may include or may be similar in many respects to operation S12 of FIG. 3B and, as such, a repeated description is omitted for the sake of brevity.

The dashboard server 110 may perform processing of the registration in response to the registration request in operation S230. Operation S230 may include or may be similar in many respects to operation S13 of FIG. 3B and, as such, a repeated description is omitted for the sake of brevity.

The dashboard server 110 may update registration status of the tokens based on the payment information in operation S240. Operation S240 may include an operation of reflecting a registration status updated according to the token registration request in the preconfigured dashboard. In an embodiment, the configuration operation may be understood to be similar to the update operation. Accordingly, operation S240 may include or may be similar in many respects to operation S14 of FIG. 3B and, as such, a repeated description is omitted for the sake of brevity In an embodiment, the dashboard may include a plurality of regions separated for each type of business or each franchise. Operation S240 in which the dashboard server 110 updates the registration status may include an operation in which the dashboard server 110 updates the registration status to add payment information to one of the plurality of regions based on the type of business or the payment franchise related to payment indicated by the payment information.

In an embodiment, operation S240 may further include an operation in which the dashboard server 110 updates the registration status to add information indicating a user account corresponding to the token and a token image corresponding to the token to one of the plurality of regions.

FIG. 8 is a flowchart illustrating a dashboard reception method, according to an embodiment of the present disclosure. Referring to FIG. 8, the dashboard reception method may be performed by the user terminal 140 and/or a computing device having the functionality of the user terminal 140.

FIG. 8 illustrates operations in which the user terminal 140 receives the dashboard based on the premise of a user's registration request. However, the user terminal 140 may receive the dashboard at another time point regardless of the user's registration request. For example, the user terminal 140 may receive the dashboard periodically after a predetermined amount of time has elapsed. Alternatively or additionally, the user terminal 140 may receive the dashboard aperiodically (e.g., randomly, in response to an event). Accordingly, the user may access the platform through the user terminal 140 periodically and/or aperiodically to identify the received dashboard.

In an embodiment, the user terminal 140 may receive information on the token corresponding to payment information of the approved transaction in operation S310. That is, the user terminal 140 may receive information on the token generated to correspond to the payment information. Alternatively or additionally, the user terminal 140 may display the information on the token on the user terminal 140. In an optional or additional embodiment, the information on the token may include a token image and/or payment information corresponding to the token.

The user terminal 140 may make a request for registering the token to the dashboard server 110 in response to a user input for the information on the token in operation S320. Operation S320 may include or may be similar in many respects to operation S12 of FIG. 3B and, as such, a repeated description is omitted for the sake of brevity.

The user terminal 140 may receive information for displaying a registration status in a dashboard form in operation S330. Operation S330 may include or may be similar in many respects to operation S15 of FIG. 3B and, as such, a repeated description is omitted for the sake of brevity.

FIG. 9 is a flowchart illustrating a token generation method in accordance with payment information, according to an embodiment of the present disclosure. In an embodiment, the token generation method may be performed by the payment server 120 and/or a computing device having a functionality of the payment server 120.

The payment server 120 may generate payment information on the transaction in operation S410. Operation S410 may include or may be similar in many respects to operation S1 of FIG. 3A and, as such, a repeated description is omitted for the sake of brevity.

The payment server 120 may generate a token corresponding to the transaction based on the payment information in operation S420. Operation S420 may include the operation in which the payment server 120 operates as the node 131 of the blockchain network 130 and generates the token and/or the operation in which the payment server 120 generates the token through an interaction with the node 131. Descriptions of operation S2 of determining whether to generate the token, operation S3 of making the request for generating the token, operation S4 of generating the token, and operation S5 of transmitting the token may be referred to for description of the corresponding operation. Operation S420 may include or may be similar in many respects to operations S2-S5 of FIG. 3A, and may include additional features as described below.

In an embodiment, the operation in which the payment server 120 generates the token may include an operation in which the payment server 120 generates the token based on whether the type of business corresponds to a predetermined type of business and/or whether the payment amount is higher than or equal to a predetermined amount.

In an embodiment, the operation in which the payment server 120 generates the token may include an operation in which the payment server 120 determines whether a payment status is valid and/or an operation in which the payment server 120 generates the token based on a determination indicating that the payment status is valid.

In an embodiment, the operation in which the payment server 120 generates the token may include an operation in which the payment server determines an image corresponding to the transaction.

The payment server 120 may transmit the token to a predetermined wallet address of the dashboard server in operation S430. Operation S430 may include or may be similar in many respects to operation S6 of FIG. 3A and, as such, a repeated description is omitted for the sake of brevity.

The payment server 120 may transmit payment information to the dashboard server 110 in operation S440. Operation S440 may include or may be similar in many respects to operation S11 of FIG. 3B and, as such, a repeated description is omitted for the sake of brevity.

In the flowcharts described above, respective operations of the method and/or the algorithm are sequentially described, but the respective operations may be performed according to an order of random combinations as well as the sequential performance. Description of the flowcharts in the present disclosure do not exclude changes and/or modifications in the method and/or the algorithm and do not mean that a random operation is necessary and/or preferable. In an embodiment, at least some operations may be performed in parallel, repeatedly, and/or heuristically. In an optional or additional embodiment, at least some operations may be omitted and/or other operations may be added.

Various embodiments according to the present disclosure may be implemented as software in a machine-readable storage medium. The software may be software for implementing various embodiments disclosed in the present disclosure. The software may be inferred from various embodiments disclosed in the present disclosure by programmers in the art to which the present disclosure belongs. For example, the software may be a program including machine-readable instructions (e.g., code or a code segment). The device may be a device capable of operating according to an instruction loaded from the storage medium, for example, a computer. In an embodiment, the device may be a computing device according to various embodiments disclosed in the present disclosure. In an optional or additional embodiment, a processor of the device may execute the loaded instruction and control elements of the device to perform a function corresponding to the instruction. The storage medium may include various types of recording medium storing machine-readable data. The storage medium may include, but not be limited to, read-only memory (ROM), random access memory (RAM), compact-disc ROM (CD-ROM), magnetic tape, floppy disk, optical data storage device, and the like. In an embodiment, the storage medium may be implemented in a form distributed to the computer systems which may be connected through a network. The software may be distributed to and stored in computer systems and executed. The storage medium may be a non-transitory computer-readable storage medium. The non-transitory storage computer-readable medium may be a tangible medium regardless of semi-permanently or temporarily stored data and does not include a transitorily spread signal.

The technical concepts according to the present disclosure have been described by various embodiments, but the technical concepts according to the present disclosure include various replacements, modifications, and changes that may be made within the scope understood by those skilled in the art to which the present disclosure belong. Further, the replacements, modifications, and changes should be understood as being included in scope of the accompanying claims. According to at least one embodiment disclosed in the present disclosure, actual purchase of a product may be guaranteed.

According to at least one embodiment disclosed in the present disclosure, a purchase trend of platform users may be identified.

According to at least one embodiment disclosed in the present disclosure, a brand advertisement effect based on the purchase trend may be maximized.

According to at least one embodiment disclosed in the present disclosure, rewards may be provided to platform users in exchange for using the platform.

According to at least one embodiment disclosed in the present disclosure, a reliable SNS for actual purchase of a product may be provided to platform users.

Effects according to the technical idea of the present disclosure are not limited to the above-mentioned effects, and other effects that have not been mentioned may be clearly understood by those skilled in the art from the contents of the present disclosure.

While the foregoing methods have been described with respect to particular embodiments, these methods may also be implemented as computer-readable codes on a computer-readable recording medium. The computer-readable recoding medium includes any kind of data storage devices that may be read by a computer system. Examples of the computer-readable recording medium may include, but may not be limited to, ROM, RAM, CD-ROM, magnetic tape, floppy disk, optical data storage device, and the like. Alternatively or additionally, the computer-readable recoding medium may be distributed to computer systems which may be connected through a network so that the computer-readable codes may be stored and executed in a distributed manner. Further, the functional programs, codes and code segments for implementing the foregoing embodiments may easily be inferred by programmers in the art to which the present disclosure pertains.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A method of processing-a token an NFT (Non-Fungible Token) of a user by an electronic device, the method comprising:

receiving, from a user terminal by the electronic device, a message requesting to register the NFT, wherein the NFT has been generated based on payment information of the user by a token generation procedure that causes one or more nodes of a blockchain network to execute a smart contract, and is transmitted to a wallet address of the electronic device;

identifying, by the electronic device, a block in which the NFT is recorded by searching the blockchain network;

acquiring, by the electronic device, payment information of the user from the identified block;

identifying, by the electronic device, a user account of the user corresponding to the payment information by comparing information on a payer included in the payment information with information on the user account; verifying, by the electronic device, a technical validity of the NFT by executing the smart contract to inquire a location in which the NFT is recorded and determining whether the location corresponds to a predefined block in a blockchain;

transmitting, by the electronic device, the verified NFT to a staking address within the blockchain network for a predetermined time period, the staking address being indicated by the smart contract, based on obtaining, from the blockchain network, a successful verification of the NFT;

generating, by the electronic device, information on a purchase trend based on a number of registered NFTs by updating a registration status of NFTs transmitted to the staking address in response to the NFT being transmitted to the staking address;

determining, by the electronic device, a reward corresponding to the registered NFT based on the updated registration status of the NFTs; and providing, by the electronic device, the determined reward to the identified user account.

2. The method of claim 1, further comprising:

transmitting, to the user terminal, registration status information of a plurality of NFTs that comprises the registered NFT and the payment information, causing the user terminal to display, in a dashboard form, a plurality of regions separated for each type of business or each payment franchise comprised by the registration status information, and to display, in at least one region of the plurality of regions, the payment information based on the type of business or the payment franchise indicated by the payment information.

3. The method of claim 2, wherein:

the registration status information further indicates the user account and an image corresponding to each of the plurality of NFTs, and the transmitting, to the user terminal, of the registration status information further causes the user terminal to display the user account and the image with the payment information in the at least one region.

4. The method of claim 1, further comprising generating reward information corresponding to the determined reward for the registered NFT.

5. The method of claim 4, wherein the generating of the reward information comprises:

when a reward criterion defined in an event for the transmitting the NFT to the staking address has been satisfied, determining whether the event corresponds to the NFT; and generating the reward information based on determining that the event corresponds to the NFT.

6. The method of claim 5, wherein the reward criterion is based on at least one of a type of business, a payment franchise, a payment time point, and a payment account.

7. The method of claim 5, wherein the generating of the reward information corresponding to the reward for the user comprises:

generating the reward information corresponding to the reward for the user based on a number of users that have registered tokens NFTs corresponding to the event.

8. The method of claim 5, wherein the reward is a virtual asset or a coupon corresponding to the event.

9. The method of claim 5, wherein the generating of the reward information corresponding to the reward for the user comprises:

generating the reward information corresponding to the reward for the user based on a registration order of registered NFTs satisfying the reward criterion.

* * * * *